US011651058B2

(12) United States Patent
Yuan

(10) Patent No.: US 11,651,058 B2
(45) Date of Patent: May 16, 2023

(54) METHOD FOR OPENING APPLICATION, ELECTRONIC APPARATUS, AND COMPUTER READABLE STORAGE MEDIUM

(71) Applicant: GUANGDONG OPPO MOBILE TELECOMMUNICATIONS CORP., LTD., Guangdong (CN)

(72) Inventor: Shilin Yuan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 642 days.

(21) Appl. No.: 16/692,754

(22) Filed: Nov. 22, 2019

(65) Prior Publication Data
US 2020/0167455 A1    May 28, 2020

(30) Foreign Application Priority Data
Nov. 27, 2018   (CN) .......................... 201811429330.7

(51) Int. Cl.
*G06F 21/32*       (2013.01)
*G06V 40/60*       (2022.01)
(Continued)

(52) U.S. Cl.
CPC .......... *G06F 21/32* (2013.01); *G06V 40/1318* (2022.01); *G06V 40/1365* (2022.01); *G06V 40/67* (2022.01)

(58) Field of Classification Search
CPC ...... G06F 21/32; G06F 1/3218; G06F 3/0488; G06F 21/629; G06V 40/1318; G06V 40/67; G06V 40/1365
See application file for complete search history.

(56) References Cited

U.S. PATENT DOCUMENTS 11,036,840 B2*   6/2021  Huang ............... G06V 40/1365
2006/0165060 A1*  7/2006  Dua ..................... H04B 5/0062
705/76
(Continued)

FOREIGN PATENT DOCUMENTS

CN   104077518 A   10/2014
CN   104951208 A    9/2015
(Continued)

OTHER PUBLICATIONS

Indian Examination Report and Translation for IN Application 201914048432 dated May 17, 2021. (9 pages).
(Continued)

*Primary Examiner* — Huan V Doan
(74) *Attorney, Agent, or Firm* — Young Basile Hanlon & MacFarlane, P.C.

(57) ABSTRACT

A method for opening an application is applied in an electronic apparatus. The electronic apparatus includes a display screen and a fingerprint identification area provided opposite a preset region of the display screen. The method includes the following operations: displaying at least one application in a preset application set in the preset region; acquiring fingerprint information when a first touch operation for a target application of the at least one application is detected; and launching the target application when it is detected that the fingerprint information matches preset fingerprint information.

18 Claims, 5 Drawing Sheets

(51) Int. Cl.
*G06V 40/13* (2022.01)
*G06V 40/12* (2022.01)

(56) References Cited

U.S. PATENT DOCUMENTS

| | | | | |
|---|---|---|---|---|
| 2007/0255963 | A1* | 11/2007 | Pizano | G06F 21/32 713/189 |
| 2012/0311436 | A1* | 12/2012 | Steele | G06F 40/106 715/246 |
| 2016/0092018 | A1 | 3/2016 | Lee et al. | |
| 2016/0179454 | A1* | 6/2016 | Liu | G06F 3/04842 715/747 |
| 2017/0123555 | A1* | 5/2017 | Kim | G06F 3/0445 |
| 2017/0308732 | A1 | 10/2017 | Wang et al. | |
| 2018/0260544 | A1* | 9/2018 | Jammalamadaka | G06F 3/04883 |
| 2019/0102597 | A1* | 4/2019 | Lu | G06V 10/141 |
| 2019/0129559 | A1* | 5/2019 | Adams | G06F 1/1626 |
| 2020/0371668 | A1* | 11/2020 | Huang | G06F 21/32 |
| 2021/0152685 | A1* | 5/2021 | Li | H04M 1/72469 |
| 2021/0181923 | A1* | 6/2021 | Luo | G06F 3/04883 |

FOREIGN PATENT DOCUMENTS

| | | |
|---|---|---|
| CN | 106022061 A | 10/2016 |
| CN | 106126015 A | 11/2016 |
| CN | 106484483 A | 3/2017 |
| CN | 106648416 A | 5/2017 |
| CN | 107103222 A | 8/2017 |
| CN | 107122649 A | 9/2017 |
| CN | 107153781 A | 9/2017 |
| CN | 107172267 A | 9/2017 |
| CN | 107180180 A | 9/2017 |
| CN | 107193472 A | 9/2017 |
| CN | 107450798 A | 12/2017 |
| CN | 108171037 A | 6/2018 |
| CN | 108319832 A | 7/2018 |
| CN | 108369618 A | 8/2018 |
| CN | 108646976 A | 10/2018 |
| CN | 108647505 A | 10/2018 |
| CN | 108664279 A | 10/2018 |
| CN | 108710469 A | 10/2018 |
| CN | 108829320 A | 11/2018 |
| CN | 109284060 A | 1/2019 |
| CN | 109409070 A | 3/2019 |
| CN | 109657441 A | 4/2019 |
| WO | 2018143673 A1 | 8/2018 |
| WO | 2018177082 A1 | 10/2018 |
| WO | 2018177083 A1 | 10/2018 |
| WO | 2018195921 A1 | 11/2018 |

OTHER PUBLICATIONS

OA for EP application 19211910.5 dated Mar. 16, 2020.
ISR for PCT application PCT/CN2019/121034 dated Jan. 23, 2020.
Chinese First Office Action with English Translation for CN Application 201811429330.7 dated Nov. 29, 2021. (13 pages).
Chinese Second Office Action with English Translation for CN Application 201811429330.7 dated Apr. 6, 2022. (12 pages).
Indian Examination Report for IN Application 201914048432 dated May 17, 2021. (9 pages).
Chinese Notification to grant Patent Right for Invention with English Translation for CN Application 201811429330.7 dated Oct. 21, 2022. (13 pages).
Chinese Office Action with English Translation for CN Application 201811429330.7, dated Jun. 29, 2022. (14 pages).

* cited by examiner

METHOD FOR OPENING APPLICATION, ELECTRONIC APPARATUS, AND COMPUTER READABLE STORAGE MEDIUM

CROSS-REFERENCE TO RELATED APPLICATION(S)

The application claims priority to and the benefits of Chinese Patent Application Serial No. 201811429330.7, filed on Nov. 27, 2018, the entire content of which is incorporated herein by reference.

TECHNICAL FIELD

The present disclosure relates to a technical field of electronic apparatuses, more particularly to a method for opening an application, an electronic apparatus, and a computer readable storage medium.

BACKGROUND

At present, with development of mobile terminal technology and software technology, a variety of applications (APPs) can be installed and used in the mobile terminal. A user usually finds that some APPs need to be frequently opened and used during use, and particularly wishes that some APPs can be quickly opened. For example, quickly open a camera of the mobile terminal in order to capture a picture. However, it is generally necessary to unlock the electronic apparatus such as a mobile phone, etc., and then flip pages to find the corresponding application before opening the application.

SUMMARY

In a first aspect, embodiments of the present application provide a method for opening an application, and the method is applied in an electronic apparatus. The electronic apparatus includes a display screen having a preset region and a fingerprint identification area provided opposite the preset region. The method includes following operations: displaying at least one application in a preset application set in the preset region; acquiring fingerprint information when a first touch operation for a target application of the at least one application is detected; and launching the target application when it is detected that the fingerprint information matches preset fingerprint information.

In a second aspect, embodiments of the present application provide an electronic apparatus. The electronic apparatus includes a processor, a memory, a communication interface, a display screen having a preset region, a fingerprint identification area corresponding to the preset region, and one or a plurality of programs stored in the memory and configured to be executed by the processor, and the one or the plurality of programs including instructions configured to execute operations in a method for opening an application, the method including following operations: displaying at least one application in the preset region; acquiring fingerprint information when a touch operation for a target application of the at least one application is detected; and launching the target application when it is detected that the fingerprint information matches preset fingerprint information.

In a third aspect, embodiments of the present application provide a computer readable storage medium. The computer readable storage medium is configured to store a computer program for electronic data interchange. The computer program enables a computer to execute a method for opening an application, the computer including a display screen having a preset region and a fingerprint identification area provided opposite the preset region, the method including following operations: displaying at least one application in the preset region; acquiring fingerprint information when a touch operation is detected; and launching touched applications when it is detected that the fingerprint information matches preset fingerprint information.

BRIEF DESCRIPTION OF DRAWINGS

To describe technical solutions in embodiments of the present application or in the related art more clearly, the following will briefly introduce the accompanying drawings required for the description of the embodiments or the related art. Obviously, the accompanying drawings described below illustrate some embodiments of the present application, and those skilled in the art can obtain other drawings based on these drawings without paying creative efforts.

DETAILED DESCRIPTION

Figure 1:
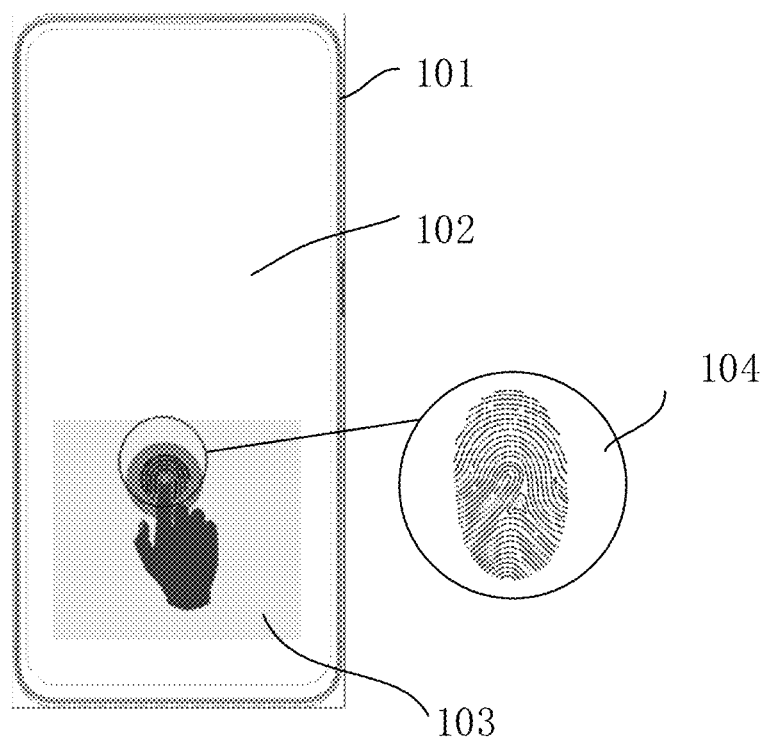
FIG. 1 is a schematic view illustrating fingerprint acquisition for an electronic apparatus provided by an embodiment of the present application.

In order to make those skilled in the art better understand the solution of the present application, technical solutions in embodiments of the present application will be clearly and completely described below with reference to the accompanying drawings in the embodiments of the present disclosure application. It is apparent that the described embodiments are only a part of the embodiments of the present application, but not all of them. Based on the embodiments of the present application, all other embodiments obtained by those skilled in the art without paying creative efforts, fall into the protection scope of the present application.

The terms "first", "second", etc., in the description, the claims and the above-described accompanying drawings are intended to distinguish different objects, but not intended to describe a particular order. In addition, the terms "comprise" and "have" and any variants thereof are intended to cover the non-exclusive inclusion. For example, a process, a method, a system, a product, or an apparatus including a series of operations or units is not limited to the listed operations or units, but optionally further comprises unlisted operations or units, or optionally further comprises other operations or units inherent to the process, the method, the product or the apparatus.

The "embodiment" mentioned in this specification means particular features, structures or characteristics described in combination of the embodiment may be included in at least one embodiment of the present application. This phrase presented in various places of this specification does not necessarily indicate the same embodiment, and also does not indicate the embodiment mutually exclusive of, independent of, or alternative to other embodiments. It could be explicitly and implicitly understood by those skilled in the art that the embodiments described herein can be combined with other embodiments.

In a first aspect, embodiments of the present application provide a method for opening an application, and the method is applied in an electronic apparatus. The electronic apparatus includes a display screen having a preset region and a fingerprint identification area provided opposite the preset region. The method includes following operations: displaying at least one application in a preset application set in the preset region; acquiring fingerprint information when a first touch operation for a target application of the at least one application is detected; and launching the target application when it is detected that the fingerprint information matches preset fingerprint information.

In a second aspect, embodiments of the present application provide an electronic apparatus. The electronic apparatus The electronic apparatus includes a processor, a memory, a communication interface, a display screen having a preset region, a fingerprint identification area corresponding to the preset region, and one or a plurality of programs stored in the memory and configured to be executed by the processor, and the one or the plurality of programs including instructions configured to execute operations in a method for opening an application, the method including following operations: displaying at least one application in the preset region; acquiring fingerprint information when a touch operation for a target application of the at least one application is detected; and launching the target application when it is detected that the fingerprint information matches preset fingerprint information.

In a third aspect, embodiments of the present application provide a computer readable storage medium. The computer readable storage medium is configured to store a computer program for electronic data interchange. The computer program enables a computer to execute a method for opening an application, the computer including a display screen having a preset region and a fingerprint identification area provided opposite the preset region, the method including following operations: displaying at least one application in the preset region; acquiring fingerprint information when a touch operation is detected; and launching touched applications when it is detected that the fingerprint information matches preset fingerprint information.

The electronic apparatus involved in embodiments of the present application may be an electronic apparatus having a fingerprint identification area. The electronic apparatus may include handheld apparatus, on-board apparatus, wearable apparatus, computing apparatus with wireless communication function, or other processing apparatus connected to wireless modems, and various types of user equipment (UE), mobile stations (MS), terminal devices, etc.

At present, some methods for rapid opening of application program include opening some preset APPs by pressing two certain buttons at the same time, or by pressing a power button to activate the screen and then sliding the screen to the left or right. However, these operations are still complicated, two buttons need to be pressed at the same time, or the power button needs to be pressed to activate the screen and then slide the screen, which is inconvenient for a user to operate. Aimed at the above-described problems, embodiments of the present application provide a method for opening an application. Embodiments of the present application will be introduced below in detail in combination with the accompanying drawings.

The fingerprint identification technology establishes a correspondence relationship between a person and his fingerprint. By comparing his fingerprint with the pre-stored fingerprint through feature points of different fingerprint details, his true identity can be verified. The feature point refers to an interrupt point, a bifurcation point, and a turn point for an interrupt, a bifurcation, a turn frequently presented in fingerprint lines. The fingerprint lines are variant and unique for everyone in terms of patterns, interrupt points, bifurcation points and turn points. Moreover, the uniqueness is unchanged throughout one's life. It is relying on such uniqueness and stability for us to create the fingerprint identification technology. The fingerprint identification technology has advantages of a fast identification speed, convenient acquisition and a low cost, etc., and is widely applied in many scientific fields such as image processing, pattern recognition, computer vision, etc. In the light-sensing screen fingerprint identification technology, i.e. the fingerprint identification technology, the fingerprint identification module is arranged under a screen panel of a mobile phone. During the identification, RGB light emitted from the module passes through the panel to form a fingerprint light membrane at the fingerprint, and acquired fingerprint information is fed back to the identification module, and compared by a system to complete operation. For example, as illustrated in FIG. 1, FIG. 1 illustrates a schematic view of a fingerprint acquisition for an electronic apparatus. The electronic apparatus is denoted as 101, a display screen is denoted as 102, a preset region for fingerprint acquisition is denoted as 103, and 104 is an enlarged view of a fingerprint. When a user' finger comes into contact with a screen, light emitted from an OLED screen passes through a cover plate to illuminate fingerprint texture so as to form a fingerprint light membrane, the fingerprint enables reflected light to pass through the screen so as to return the reflected light to the fingerprint module, and finally a fingerprint image is formed for identity authentication and identification. It should be noted that, compared with the conventional single-point type fingerprint identification which has a small identification area, the fingerprint identification area in the present disclosure has a larger area, even covers the whole screen of the electronic device, so that an area-type fingerprint can be identified.

Figure 2:
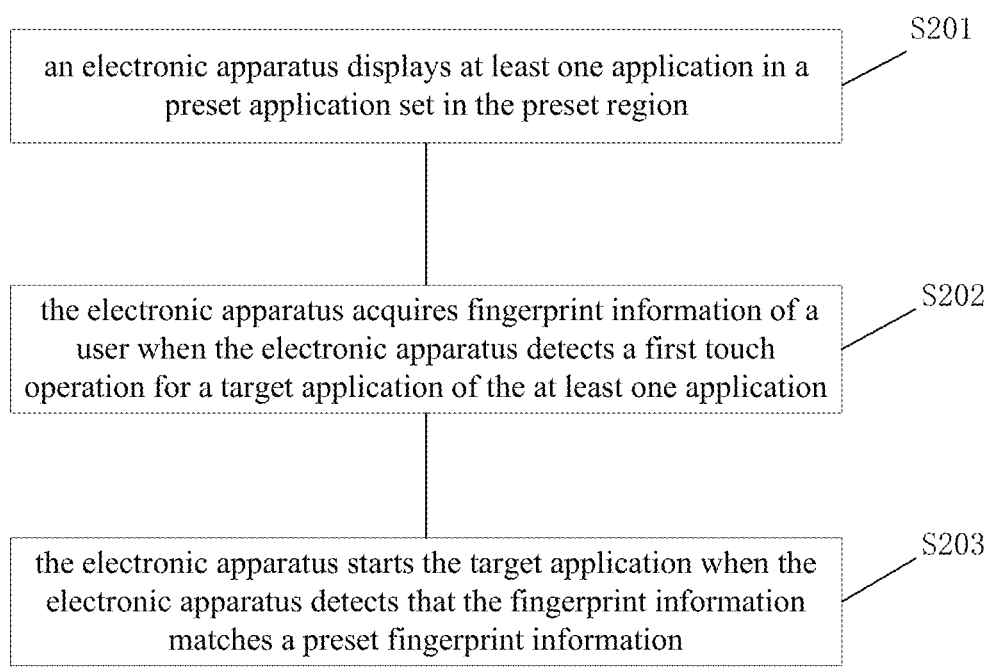
FIG. 2 is a flow chart of a method for opening an application provided by an embodiment of the present application.

Referring to FIG. 2, FIG. 2 is a flow chart illustrating a method for opening an application provided by embodiments of the present application, which is applied in the electronic apparatus. The electronic apparatus includes a display screen and a fingerprint identification area corresponding to a preset region of the display screen.

In some embodiments of the present disclosure, the fingerprint identification area is opposite to the preset region of the display screen.

As illustrated, the method for opening an application includes following operations:

S201: the electronic apparatus displays at least one application in a preset application set in the preset region.

The application, i.e. the application program (APP), refers to a computer program configured to complete one or a plurality of particular works. It operates in a user mode, is interactable with a user, and has a visible user interface. The preset region corresponds to the fingerprint identification area.

The fingerprint identification area can be provided with an under-screen fingerprint module (for example, an optical fingerprint module) or an in-screen fingerprint module (for example, a capacitive fingerprint module), and may be a lower side of the screen, which is not exclusively limited herein.

The electronic apparatus is in a screen locked state or a screen unlocked state.

S202: the electronic apparatus acquires fingerprint information of a user when the electronic apparatus detects a first touch operation for a target application of the at least one application.

There may be one or a plurality of target applications, and the touch operation corresponds to a single touch or a multi-touch.

The user can select the target application that needs to be opened according to the at least one application displayed in the preset region. The electronic apparatus acquires the fingerprint information of the user's finger used to perform the touch operation when the electronic apparatus detects the first touch operation by the user for the target application. The touch operation may be a tap touch operation and a long-press touch operation. For example, what is displayed in the preset region is an instant messaging application (QQ, wechat, etc.). When the user needs to open QQ, he may select to tap QQ application icon, or to long-press the QQ application icon.

S203: the electronic apparatus launches the target application when the electronic apparatus detects that the fingerprint information matches preset fingerprint information.

In a specific implementation, the electronic apparatus detects the fingerprint information for touching the target application, and compares it with the preset fingerprint information, and determines whether the acquired fingerprint information matches the preset fingerprint information.

It could be seen that, in the embodiments of the present application, the electronic apparatus displays at least one application of the preset application set in preset region; the electronic apparatus acquires the user's fingerprint information when a first touch operation for the target application of the at least one application is detected; and the electronic apparatus launches the target application when the electronic apparatus detects that the fingerprint information matches the preset fingerprint information. Consequently, the electronic apparatus can perform the screen unlocking and rapid launching of the target application when the identity authentication is directly passed under a simple operation, e.g. by touching or pressing the target application. The safety and privacy of a terminal is ensured, while speed and convenience for launching of the application is guaranteed.

In some embodiments of the present disclosure, the electronic apparatus is in the screen locked state. The operation of launching the target application includes removing a screen locked state of the electronic apparatus; and displaying a preset interface of the target application.

Consequently, in the present embodiment, specific to the screen locked state, by acquiring the fingerprint information of the user's finger pressed on the target application of the preset region, the electronic apparatus can identify the user's identity, release the screen locked state, and launch the selected application, thereby improving convenience and efficiency of launching the target application in the screen locked state of the electronic apparatus.

In some embodiments of the present disclosure, the electronic apparatus is in the screen unlocked state, and the target application is an encrypted application. The operation of launching the target application includes displaying a preset interface of the target application.

The preset interface includes a launching interface, a particular function interface such as a payment interface, etc., which is not exclusively limited herein.

Consequently, in the present embodiment, specific to the screen unlocked state, by acquiring the fingerprint information of the user's finger pressed on the target application of the preset region, the electronic apparatus can identify the user's identity, and directly launch the preset interface of the target application, thereby improving convenience and efficiency of launching the encrypted target application under the screen unlocked state of the electronic apparatus.

In some embodiments of the present disclosure, the operation of displaying at least one application in the preset application set in the preset region includes displaying the at least one application in the preset region according to a displaying position for the at least one application in the preset application set in a system desktop.

A displaying situation of the at least one application in the preset region may be consistent with a displaying situation in the system desktop, and may also be inconsistent with the displaying situation in the system desktop, which is not specifically and exclusively limited.

Consequently, in the present embodiment, the electronic apparatus can flexibly display the application in the preset region, thereby improving flexibility of application display.

In some embodiments of the present disclosure, the operation of displaying the at least one application in the preset application set in the preset region includes adjusting brightness of the preset region in accordance with a preset strategy when it is detected that a second touch operation on the display screen satisfies a preset condition, and displaying the at least one application in the preset application set in the preset region according to the second touch operation.

In a specific implementation, the user touches the display screen in accordance with the preset condition, and the application required by the user is displayed in the preset region according to the user's second touch operation. For example, an instant messaging application, a multimedia application or the like is displayed in the preset region according to the user's operation.

Consequently, in the present embodiment, the electronic apparatus can intelligently display the at least one application according to the user's second touch operation, thereby improving intelligence and flexibility of the application display.

In the present embodiment, the operation of displaying the at least one application in the preset application set in the preset region according to the second touch operation includes querying a preset mapping relationship according to the second touch operation, and acquiring the preset application set corresponding to the second touch operation, the mapping relationship including correspondence relationship between touch operations and application sets; and displaying at least one application in the preset application set corresponding to the second touch operation in the preset region in accordance with a preset display strategy.

The second touch operation may be to slide a particular track on the display screen or double tap the display screen, etc. For example, when double tapping the display screen, the application set corresponding to the double tap touch operation is displayed in the preset region. The application set in the above-described mapping relationship is a user defined set, or an application set added by the electronic apparatus based on historical data.

Consequently, in the present embodiment, the electronic apparatus can query the mapping and acquire the corresponding application set based on the second touch operation, so as to prevent from wasting time to unlock and flip the mobile phone display interface, and then find the application required by the user, such that the operation is simple and convenient, and speed for finding the application required by the user is increased.

In some embodiments of the present disclosure, the operation of displaying at least one application in the preset application set corresponding to the second touch operation in the preset region in accordance with the preset display strategy includes acquiring an application icon of the at least one application in the preset application set; adjusting a size of the application icon, and displaying the at least one application in the preset application set in the preset region in a static arrangement.

The preset region of the display screen has a limited area, the size of the application icon in the application set in the preset region can be adjusted according a size of the preset region and the number of the applications in the preset application set; or the icons can be arranged in descending order according to the preset application set and historical use or launching data by the user for the applications in the preset application set.

The application icons in the preset region can be arranged according to alphabetical order of the applications, and can also be arranged in accordance with use frequency by the user, and can further be arranged in real time according to the user's demands, which is not limited herein.

Consequently, in the present embodiment, since the electronic apparatus can adjust the size of the application icon based on the area of the preset region and the number of the applications in the preset application set, and the user can select the target application in one display page, thereby saving time and improving efficiency of selection of the target application.

In some embodiments of the present disclosure, the operation of displaying at least one application in the preset application set corresponding to the second touch operation in the preset region in accordance with the preset display strategy includes determining different groups according to types of different applications in the preset application set; and displaying the at least one application in the preset application set in the preset region according to the groups.

In one preset application set, the applications may be divided into different groups according to instant messaging application type applications, multimedia type applications, reading type applications, photographing type applications, and payment type applications, etc. When displaying, the groups may be displayed in the preset region in the form of a list, and may also be divided into several large markers according to the types. When the large marker is tapped, the applications associated with this large marker then are displayed. The display of the application icons can be arranged according to alphabetical order of the applications, and can also be arranged in accordance with use frequency by the user, and can further be arranged in real time according to the user's demands, which is not limited herein.

Consequently, in the present embodiment, the electronic apparatus can display the applications in groups based on the types of the application, thereby greatly saving the time for the user to find the target application, and improving the efficiency of selection and launching of the target application.

In some embodiments of the present disclosure, the operation of displaying at least one application in the preset application set corresponding to the second touch operation in the preset region in accordance with the preset display strategy includes dynamically displaying the at least one application in the preset application set in the preset region, and the dynamical display including sliding display and scroll display.

The dynamical display includes the sliding display and the scroll display, and the dynamical display may display the application in the preset application set which is currently not displayed in the preset region. The sliding display is achieved based on a sliding operation, and the sliding operation includes one or a plurality of leftward sliding operation, rightward sliding operation, upward sliding operation and downward sliding operation. The user can retrieve the application in the preset application set which is not displayed in the preset region from different directions according to the different sliding operations. The scroll operation is achieved based on a scroll operation, and the scroll operation includes one or a plurality of leftward scroll operation, rightward scroll operation, upward scroll operation and downward scroll operation. The scroll operation may repeat retrieval and display of the application in the preset application set which is already displayed once.

The application icons of the preset application set can be arranged according to alphabetical order of the applications, and can also be arranged in accordance with use frequency by the user, and can further be arranged in real time according to the user's demands, which is not limited herein.

Consequently, in the present embodiment, the electronic apparatus can slide or scroll the display page of the application in the preset region, and can completely display all the applications of the preset application set by the sliding display and the scroll display when the preset application set has a relatively large number, thereby saving the user's time for finding the corresponding icon, improving efficiency of the user's operation, and enhancing the user experience.

In some embodiments of the present disclosure, prior to the operation of adjusting brightness of the preset region in accordance with a preset strategy when it is detected that a second touch operation on the display screen satisfies a preset condition, and displaying the at least one application in the preset application set in the preset region according to the second touch operation, it further includes determining the preset application set according to a user setting; or acquiring the number of launching of each application within a preset time, and determining the preset application set according to the number of launching.

The electronic apparatus detects a setting event for the preset application set displayed in the preset region by the user, that is, the user customizes the preset application set; it also can be determined according to the number of launching of the applications of the electronic apparatus within the preset time period. For example, the user may customize the preset application set to include QQ, microblog, music, video, etc. Alternatively, the electronic apparatus acquires the number of launching of the applications within a preset time of one week, and arranges the applications in a descending order in accordance with the number of launching. All of the arranged applications may be displayed in the preset region, or only the at least one application having a relatively great number of launchings is displayed according to a preset number of displays.

Consequently, in the present embodiment, the electronic apparatus customizes the preset application set according to the user's actual requirements or intelligently sets the preset application set according to historical launching data, thereby improving the efficiency and speed for selecting the target application and operational efficiency by the user, and enhancing the user experience.

In some embodiments of the present disclosure, the operation of adjusting the brightness of the preset region according to the preset strategy includes lightening the preset region when the electronic apparatus is in a screen extinguished-and-locked state, adjusting a brightness value of the preset region to be greater than or equal to a first brightness threshold, the first brightness threshold being a brightness value that satisfies minimum requirement for acquisition of the fingerprint information by the fingerprint identification area; or, lightening the display screen when the electronic apparatus is in the screen extinguished-and-locked state, adjusting the brightness value of the preset region to be greater than or equal to a first brightness threshold, the first brightness threshold being a brightness value that satisfies minimum requirement for acquisition of the fingerprint information by the fingerprint identification area; or, acquiring a brightness value of the display screen when the electronic apparatus is in a screen lightened-and-locked state, the brightness value of the display screen being a second brightness threshold, and adjusting the brightness value of the preset region to be greater than or equal to the second brightness threshold.

After the electronic apparatus detects the touch operation, when the electronic apparatus is currently in the screen extinguished-and-locked state, the electronic apparatus lightens the preset region or the whole display screen according to remaining power or the user defined selection. In a case where the electronic apparatus intelligently performs adjustment according to the remaining power, when the electronic apparatus has a lot of remaining power, the electronic apparatus can intelligently select to lighten the display screen and adjust the brightness of the preset region to be a high brightness so as to facilitate fast and accurate acquisition of the fingerprint information; when the electronic apparatus has little remaining power, the electronic apparatus can select to only lighten the preset region and adjust the brightness of the preset region to be merely greater than or equal to a first brightness that satisfies the minimum requirement for acquisition of the fingerprint information by the fingerprint identification area. After the electronic apparatus detects the touch operation, when the electronic apparatus is currently in the screen lightened-and-locked state, the brightness value of the preset region is adjusted to be greater than the rest area of the display screen, so as to facilitate the fast and accurate acquisition of the fingerprint information.

Consequently, in the present embodiment, the electronic apparatus determines a screen lightening strategy based on a power supply capacity and whether the electronic apparatus is in a screen lightened state, such that the acquisition of the fingerprint information is facilitated, the speed of the fingerprint identification is fast and accurate, and accuracy and efficiency of acquisition of the fingerprint information is improved.

In some embodiments of the present disclosure, prior to the operation of launching the target application, the method further includes lightening the whole display screen when it is detected that the display screen is not in a whole screen lightened state; maintaining the whole screen lightened state of the display screen when it is detected that the display screen is in the whole screen lightened state.

After the fingerprint is successfully matched, lightening the whole display screen when the display screen is currently not in the whole screen lightened state; maintaining the whole screen lightened state when the display screen is currently in the whole screen lightened state.

Consequently, in the present embodiment, by means of the fingerprint identification, the electronic apparatus can be ensured to lighten the whole display screen, remove the screen locked interface, and display the preset interface of the target application, so as to achieve fast unlocking and entry to the target application, which is convenient and efficient.

In some embodiments of the present disclosure, after the operation of acquiring the user's fingerprint information when the first touch operation for the target application is detected, the method further includes prompting the user to re-enter the fingerprint when it is detected that the fingerprint information does not match the preset fingerprint information; and extinguishing the display screen when the re-entry of the fingerprint is not detected within a preset time.

When it is detected that the fingerprint information does not match the preset fingerprint information, the user is prompted that the identity verification fails, and the re-entry of the fingerprint information is required. When the re-entry of the fingerprint is not detected within the preset time, the display screen is extinguished. Extinguishing the display screen includes extinguishing the preset region and extinguishing the whole display screen. For example, a mistouch event with a very low probability may occur, and the preset application set is displayed in the preset region, the display screen is directly extinguished when no fingerprint is entered for verification within a preset time range.

Consequently, in the present embodiment, the electronic apparatus launches the application through fingerprint information identification, and extinguishes the display screen when the acquired fingerprint does not match, thereby improving safety of the electronic apparatus and the application.

Figure 3:
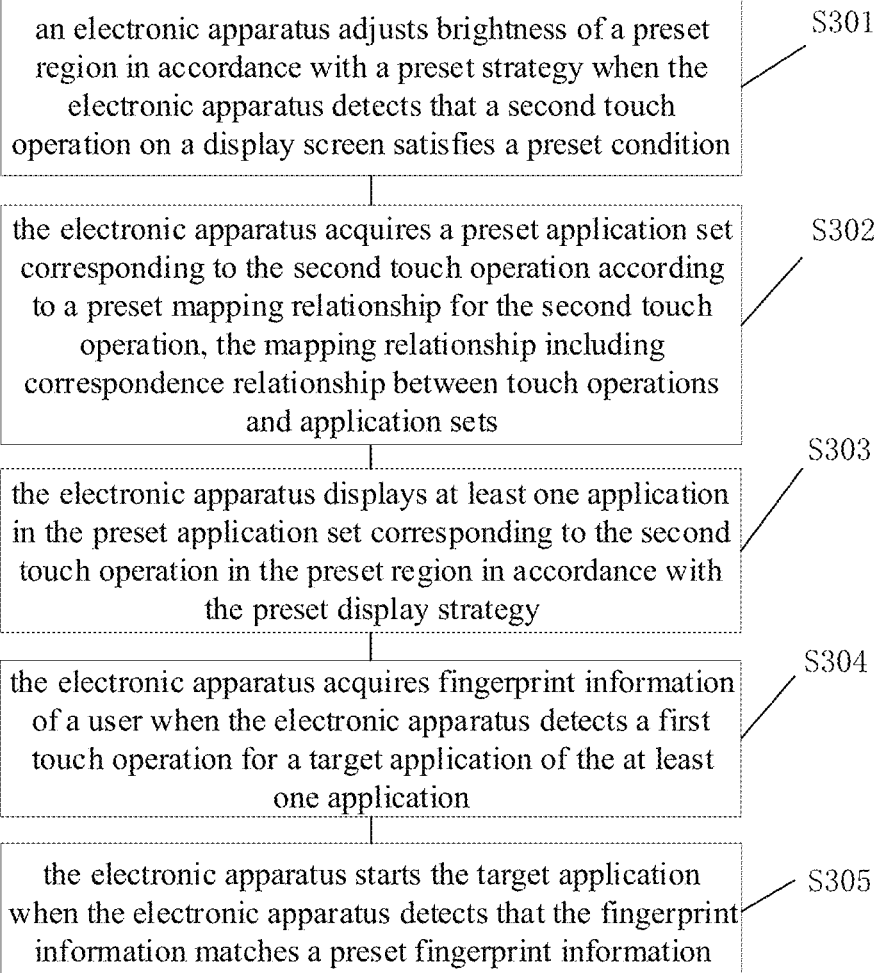
FIG. 3 is a flow chart of another method for opening an application provided by an embodiment of the present application.

As consistent with the above embodiment illustrated in FIG. 2, referring to FIG. 3, FIG. 3 is a flow chart illustrating a method for opening an application provided by embodiments of the present application, which is applied in the electronic apparatus as illustrated in FIG. 1. The electronic apparatus includes a radar sensor. As illustrated, the method for opening an application includes following operations:

S301: the electronic apparatus adjusts brightness of the preset region in accordance with a preset strategy when the electronic apparatus detects that a second touch operation on the display screen satisfies a preset condition.

S302: the electronic apparatus acquires the preset application set corresponding to the second touch operation according to a preset mapping relationship for the second touch operation, the mapping relationship including correspondence relationship between touch operations and application sets.

S303: the electronic apparatus displays at least one application in the preset application set corresponding to the second touch operation in the preset region in accordance with the preset display strategy.

S304: the electronic apparatus acquires fingerprint information of a user when the electronic apparatus detects a first touch operation for a target application of the at least one application.

S305: the electronic apparatus launches the target application when the electronic apparatus detects that the fingerprint information matches preset fingerprint information.

It could be seen that, in the embodiments of the present application, the electronic apparatus displays at least one application in the preset application set in preset region; the electronic apparatus acquires the user's fingerprint information when a first touch operation for the target application of the at least one application is detected; and the electronic apparatus launches the target application when the electronic apparatus detects that the fingerprint information matches the preset fingerprint information. Consequently, the electronic apparatus can perform the screen unlocking and rapid launching of the target application when the identity authentication is passed under a simple operation, e.g. by touching or pressing the target application. The safety and privacy of a terminal is ensured, while speed and convenience for launching of the application is guaranteed.

In addition, when the electronic apparatus can match the preset touch operation based on the touch operation, the corresponding application set corresponding to the touch operation is displayed, so as to prevent from wasting time to unlock and flip the mobile phone display interface, and then find the application required by the user, such that the operation is simple and convenient, and speed for finding the application required by the user is increased.

Figure 4:
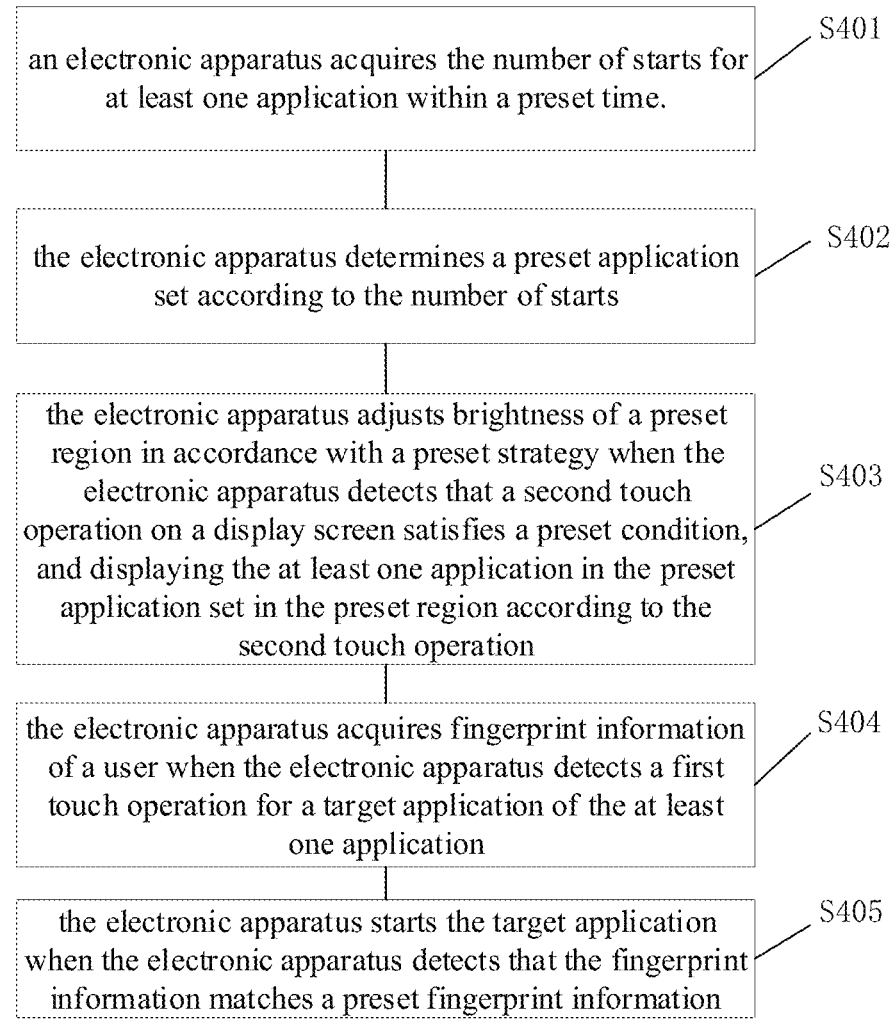
FIG. 4 is a flow chart of another method for opening an application provided by an embodiment of the present application.

As consistent with the above embodiment illustrated in FIG. 2, referring to FIG. 4, FIG. 4 is a flow chart illustrating a method for opening an application provided by embodiments of the present application, which is applied in the electronic apparatus. The electronic apparatus includes a radar sensor. As illustrated, the method for opening an application includes operations of:

S401: the electronic apparatus acquires the number of launching of the at least one application within a preset time.

S402: the electronic apparatus determines the preset application set according to the number of launching.

S403: the electronic apparatus adjusts brightness of the preset region in accordance with a preset strategy when the electronic apparatus detects that a second touch operation on the display screen satisfies a preset condition, and displaying the at least one application in the preset application set in the preset region according to the second touch operation.

S404: the electronic apparatus acquires fingerprint information of a user when the electronic apparatus detects a first touch operation for a target application of the at least one application.

S405: the electronic apparatus launching the target application when the electronic apparatus detects that the fingerprint information matches preset fingerprint information.

It could be seen that, in the embodiments of the present application, the electronic apparatus displays at least one application in the preset application set in preset region; the electronic apparatus acquires the user's fingerprint information when a first touch operation for the target application of the at least one application is detected; and the electronic apparatus launches the target application when the electronic apparatus detects that the fingerprint information matches the preset fingerprint information. Consequently, the electronic apparatus can perform the screen unlocking and rapid launching of the target application when the identity authentication is passed under a simple operation, e.g. by touching or pressing the target application. The safety and privacy of a terminal is ensured, while speed and convenience for launching of the application is guaranteed.

In addition, the electronic apparatus intelligently sets the preset application set according to historical launching data, thereby improving the efficiency and speed for selecting the target application by the user, and enhancing the user experience.

Figure 5:
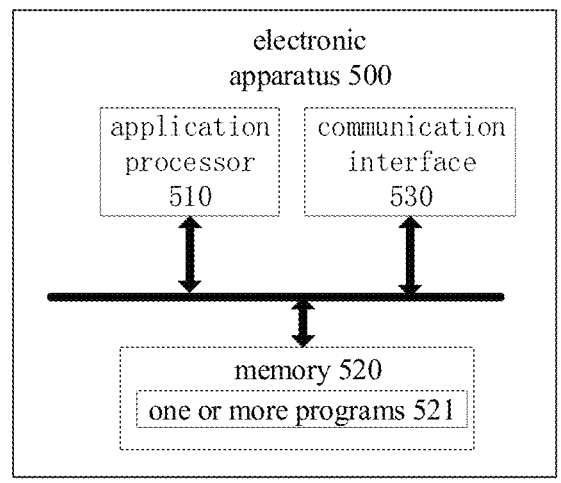
FIG. 5 is a schematic view of an electronic apparatus provided by an embodiment of the present application.

As consistent with the above embodiments illustrated in FIGS. 2, 3 and 4, referring to FIG. 5, FIG. 5 is a schematic view of an electronic apparatus 500 provided by embodiments of the present application. As illustrated, the electronic apparatus 500 includes an application processor 510, a memory 520, a communication interface 530 and one or a plurality of programs 521. The one or a plurality of programs 521 are stored in the above memory 520, and configured to be executed by the above application processor 510. The one or a plurality of programs 521 includes instructions configured to execute the following operations:

displaying at least one application in a preset application set in the preset region;

acquiring fingerprint information of a user when a first touch operation for a target application of the at least one application is detected; and launching the target application when it is detected that the fingerprint information matches preset fingerprint information.

It could be seen that, in the embodiments of the present application, the electronic apparatus displays at least one application in the preset application set in preset region; the electronic apparatus acquires the user's fingerprint information when a first touch operation for the target application of the at least one application is detected; and the electronic apparatus launches the target application when the electronic apparatus detects that the fingerprint information matches the preset fingerprint information. Consequently, the electronic apparatus can perform the screen unlocking and rapid launching of the target application when the identity authentication is passed under a simple operation, e.g. by touching or pressing the target application. The safety and privacy of a terminal is ensured, while speed and convenience for launching of the application is guaranteed.

In some embodiments of the present disclosure, in terms of displaying the at least one application in the preset application set in the preset region according to the second touch operation, the instructions in the program are specifically configured to perform the following operations: querying a preset mapping relationship according to the second touch operation, and acquiring the preset application set corresponding to the second touch operation, the mapping relationship including correspondence relationship between touch operations and application sets; and displaying at least one application in the preset application set corresponding to the second touch operation in the preset region in accordance with a preset display strategy.

In some embodiments of the present disclosure, in terms of displaying at least one application in the preset application set corresponding to the second touch operation in the preset region in accordance with the preset display strategy, the instructions in the program are specifically configured to perform the following operations: acquiring an application icon of the at least one application in the preset application set; adjusting a size of the application icon, and displaying the at least one application in the preset application set in the preset region in a static arrangement.

In some embodiments of the present disclosure, in terms of displaying at least one application in the preset application set corresponding to the second touch operation in the preset region in accordance with the preset display strategy, the instructions in the program are specifically configured to perform the following operations: determining different groups according to types of different applications in the preset application set; and displaying the at least one application in the preset application set in the preset region according to the groups.

In some embodiments of the present disclosure, in terms of displaying at least one application in the preset application set corresponding to the second touch operation in the preset region in accordance with the preset display strategy, the instructions in the program are specifically configured to perform the following operations: dynamically displaying the at least one application in the preset application set in the preset region, and the dynamical display including sliding display and scrolling display.

In some embodiments of the present disclosure, the instructions in the program are specifically configured to perform the following operations: prior to the operation of adjusting brightness of the preset region in accordance with a preset strategy when it is detected that a second touch operation on the display screen satisfies a preset condition, and displaying the at least one application in the preset application set in the preset region according to the second touch operation, determining the preset application set according to a user setting; or acquiring the number of launching for each application within a preset time, and determining the preset application set according to the number of launching.

In some embodiments of the present disclosure, in terms of adjusting the brightness of the preset region according to the preset strategy, the instructions in the program are specifically configured to perform the following operations: lightening the preset region when the electronic apparatus is in a screen extinguished-and-locked state, adjusting the brightness value of the preset region to be greater than or equal to a first brightness threshold, the first brightness threshold being a brightness value that satisfies minimum requirement for acquisition of the fingerprint information by the fingerprint identification area; or, lightening the display screen when the electronic apparatus is in the screen extinguished-and-locked state, adjusting the brightness value of the preset region to be greater than or equal to a first brightness threshold, the first brightness threshold being a brightness value that satisfies minimum requirement for acquisition of the fingerprint information by the fingerprint identification area; or, acquiring a brightness value of the display screen when the electronic apparatus is in a screen lightened-and-locked state, the brightness value of the display screen being a second brightness threshold, and adjusting the brightness value of the preset region to be greater than or equal to the second brightness threshold.

In some embodiments of the present disclosure, in terms of launching the target application, the instructions in the programs are specifically configured to execute the following operations: lightening the display screen; removing the screen locked interface; and displaying the preset interface of the target application.

In some embodiments of the present disclosure, the programs further include instructions configured to execute the following operations: after the operation of acquiring the user's fingerprint information when the first touch operation for the target application is detected, prompting the user to re-enter the fingerprint when it is detected that the fingerprint information does not match the preset fingerprint information; and extinguishing the display screen when the re-entry of the fingerprint is not detected within a preset time.

The above introduces the solutions of embodiments of the present application mainly from a perspective of method side execution process. It could be understood that, in order to realize the above-described functions, the electronic apparatus includes the respective hardware structures and/or software modules configured to execute respective functions. It should be easily realized by those skilled in the art that, in view of units and algorithm operations of various examples described in the embodiments provided herein, the present application can implement in hardware form or in a combination of hardware and computer software form. Whether a function is performed in hardware or in a manner that the computer software drives the hardware, depends on particular application and design constrain condition of the technical solution. A professional person may implement the described function using different methods for each particular application, but this implementation should not be considered to beyond the scope of the present application.

Embodiments of the present application can perform division of function units of the electronic apparatus according to the above-described method examples. For example, individual function units can be divided corresponding to respective functions, and two or more than two functions may be integrated into one processing unit. The above-described integrated unit may be realized in a form of hardware or in a form of software function units. It should be noted that, the division of the units in the embodiments of the present application is an example, merely relates to a logical function division, and may be otherwise divided in actual implementation.

Figure 6:
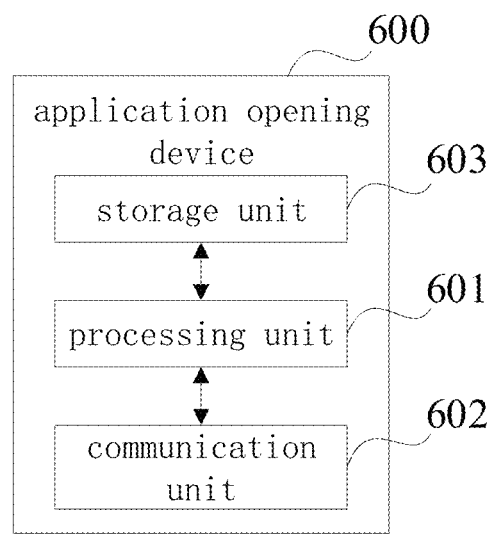
FIG. 6 is a block diagram illustrating functional elements of an application opening device provided by an embodiment of the present application.

FIG. 6 is a block diagram illustrating functional elements of an application opening device 600 involved in an embodiment of the present application. The application opening device 600 is applied in the electronic apparatus. The electronic apparatus includes a display screen and a fingerprint identification area corresponding to a preset region of the display screen. The application opening device 600 includes a processing unit 601 and a communication unit 602.

The processing unit 601 is configured to display at least one application in the preset application set in preset region through the communication unit 602; acquires the user's fingerprint information when a first touch operation for the target application of the at least one application is detected; and launches the target application when it is detected that the fingerprint information matches the preset fingerprint information.

The application opening device 600 may also include a storage unit 603 configured to store program codes and data of the electronic apparatus. The processing unit 601 may be a processor, the communication unit 602 may be a touch display screen or a transceiver, and the storage unit 603 may be a memory.

It could be seen that, in the embodiments of the present application, the electronic apparatus displays at least one application in the preset application set in preset region; the electronic apparatus acquires the user's fingerprint information when a first touch operation for the target application of the at least one application is detected; and the electronic apparatus launches the target application when the electronic apparatus detects that the fingerprint information matches the preset fingerprint information. Consequently, the electronic apparatus can perform the screen unlocking and rapid launching of the target application when the identity authentication is passed under a simple operation, e.g. by touching or pressing the target application. The safety and privacy of a terminal is ensured, while speed and convenience for launching of the application is guaranteed.

In some embodiments of the present disclosure, in terms of displaying the at least one application in the preset application set in the preset region according to the second touch operation, the processing unit 601 is specifically configured to query a preset mapping relationship according to the second touch operation, and acquire the preset application set corresponding to the second touch operation, the mapping relationship including correspondence relationship between touch operations and application sets; and display at least one application in the preset application set corresponding to the second touch operation in the preset region in accordance with a preset display strategy.

In some embodiments of the present disclosure, in terms of displaying at least one application in the preset application set corresponding to the second touch operation in the preset region in accordance with the preset display strategy, the processing unit 601 is specifically configured to acquire an application icon of the at least one application in the preset application set; adjust a size of the application icon, and display the at least one application in the preset application set in the preset region in a static arrangement.

In some embodiments of the present disclosure, in terms of displaying at least one application in the preset application set corresponding to the second touch operation in the preset region in accordance with the preset display strategy, the processing unit 601 is specifically configured to determine different groups according to types of different applications in the preset application set; and display the at least one application in the preset application set in the preset region according to the groups.

In some embodiments of the present disclosure, in terms of displaying at least one application in the preset application set corresponding to the second touch operation in the preset region in accordance with the preset display strategy, the processing unit 601 is specifically configured to dynamically display the at least one application in the preset application set in the preset region, and the dynamical display including sliding display and scrolling display.

In some embodiments of the present disclosure, prior to the operation of adjusting brightness of the preset region in accordance with a preset strategy when it is detected that a second touch operation on the display screen satisfies a preset condition, and displaying the at least one application in the preset application set in the preset region according to the second touch operation, the processing unit 601 is further configured to determine the preset application set according to a user setting; or acquire the number of launching for each application within a preset time, and determine the preset application set according to the number of launching.

In some embodiments of the present disclosure, in terms of adjusting the brightness of the preset region according to the preset strategy, the processing unit 601 is specifically configured to lighten the preset region when the electronic apparatus is in a screen extinguished-and-locked state, adjust the brightness value of the preset region to be greater than or equal to a first brightness threshold, the first brightness threshold being a brightness value that satisfies minimum requirement for acquisition of the fingerprint information by the fingerprint identification area; or, lighten the display screen when the electronic apparatus is in the screen extinguished-and-locked state, adjust the brightness value of the preset region to be greater than or equal to a first brightness threshold, the first brightness threshold being a brightness value that satisfies minimum requirement for acquisition of the fingerprint information by the fingerprint identification area; or, acquire a brightness value of the display screen when the electronic apparatus is in a screen lightened-and-locked state, the brightness value of the display screen being a second brightness threshold, and adjust the brightness value of the preset region to be greater than or equal to the second brightness threshold.

In some embodiments of the present disclosure, in terms of launching the target application, the processing unit 601 is specifically configured to lighten the display screen; remove the screen locked interface; and display the preset interface of the target application.

In some embodiments of the present disclosure, after the operation of acquiring the user's fingerprint information when the first touch operation for the target application is detected, the processing unit 601 is further configured to prompt the user to re-enter the fingerprint when it is detected that the fingerprint information does not match the preset fingerprint information; and extinguish the display screen when the re-entry of the fingerprint is not detected within a preset time.

Embodiments of the present application also provide a computer storage medium. The computer storage medium stores a computer program configured for electronic data interchange, and the computer program enables the computer to execute a part of or all of the operations of any method recited in the above-described method embodiments. The afore-mentioned computer includes the electronic apparatus.

Embodiments of the present application also provide a computer program product. The computer program product includes a non-transitory computer readable storage medium storing a computer program, and the computer program is operable to enable the computer to execute a part of or all of the operations of any method recited in the above-described method embodiments. The computer program product may be a software package, and the computer includes the electronic apparatus.

It should note that, each of the afore-mentioned method embodiments is expressed as a combination of a series of actions for simplification of description. However, those skilled in the art should aware that the present application is not limited by the described action order, because some operations may adopt other orders or perform simultaneously according to the present application. Furthermore, those skilled in the art also should aware that the embodiments described in the specification all belong to preferred embodiments, the involved actions and modules are not necessarily required by the present application.

In the above-described embodiments, description of individual embodiments has respective extra emphasis, and a portion not elaborated in an embodiment may refer to related description in other embodiments.

In the several embodiments provided by the present application, it should be appreciated that, the disclosed device can be implemented in other manners. For instance, the above-described device embodiments are merely examples. For example, the above-described division of units merely relates to a logical function division, and may be otherwise divided in actual implementation. For example, a plurality of units or assemblies may be combined or integrated into another system, or some feature may be omitted or may not be executed. Another point is that, illustrated or discussed coupling or direct coupling or communication connection from one another may be an indirect coupling or communication connection via some interfaces, devices or units, and may be electrical or other forms.

The above-described unit illustrated as separate components may be physically separate or may not be physically separate, the component illustrated as a unit may be a physical unit or may not be a physical unit, i.e. it may be located at one place, or may also be distributed at a plurality of network units. The purpose of the solution of the embodiment may be achieved by selecting a part of or a whole of the unit according to actual requirement.

In addition, each function unit of the embodiments of the present application may be integrated in a processing unit, or these units may be separate physical existence, or two or more units are integrated in a processing unit. The above-described integrated unit may be realized in a form of hardware or in a form of software function units.

When the above-described integrated unit is realized in a form of software function unit and is sold or used as a standalone product, the integrated unit may be stored in a computer readable storage medium. Based on such understanding, a substantive portion or rather a portion contributing to the related art of the technical solution of the present application, or a whole of or a part of the technical solution may be embodied in the form of a software product. The computer software product is stored in one memory, and includes several instructions configured to enable one computing apparatus (e.g. a personal computer, a server or a network apparatus, etc.) to execute all of or a part of operations of the above-described method of individual embodiments of the present application. The afore-mentioned memory includes various mediums capable of storing the program codes such as, a U disk, a read-only memory (ROM), a random access memory (RAM), a mobile hard disk, a magnetic disk, and a light disk, etc.

The embodiments of the present application are described in detail above, the principle and implementation of the present application are elaborated by using specific examples herein, and the illustration of the above embodiments is only aimed to help understanding of the method and core concept of the present application. Meanwhile, the specific embodiments and the applied ranges can be changed for those skilled in the art according to the concept of the present disclosure. In general, the content of the present specification should not be construed to limit the present disclosure.

What is claimed is:

1. A method for opening an application, applied in an electronic apparatus, the electronic apparatus comprising:
   a display screen having a preset region; and
   a fingerprint identification area provided opposite the preset region,
   wherein the method comprises:
      displaying at least one application in a preset application set in the preset region;
      acquiring fingerprint information when a first touch operation for a target application of the at least one application is detected; and
      launching the target application when it is detected that the fingerprint information matches preset fingerprint information,
      wherein displaying the at least one application in the preset application set in the preset region comprises:
      adjusting brightness of the preset region in accordance with a preset strategy when it is detected that a second touch operation on the display screen satisfies a preset condition; and
      displaying the at least one application in the preset application set in the preset region according to the second touch operation,
      wherein displaying the at least one application in the preset application set in the preset region according to the second touch operation comprises:
         querying a preset mapping relationship according to the second touch operation;
         acquiring the preset application set corresponding to the second touch operation, the preset mapping relationship comprising correspondence relationship between touch operations and application sets; and
         displaying at least one application in the preset application set corresponding to the second touch operation in the preset region in accordance with a preset display strategy.

2. The method according to claim 1, wherein the electronic apparatus is in a screen locked state, and launching the target application comprises removing a screen locked interface of the electronic apparatus and displaying a preset interface of the target application.

3. The method according to claim 1, wherein the electronic apparatus is in a screen unlocked state, the target application is an encrypted application, and launching the target application comprises displaying a preset interface of the target application.

4. The method according to claim 1, wherein displaying at least one application in the preset application set, corresponding to the second touch operation in the preset region in accordance with the preset display strategy comprises:
   acquiring an application icon of the at least one application in the preset application set; and
   adjusting a size of the application icon, and displaying the at least one application in the preset application set in the preset region in a static arrangement.

5. The method according to claim 1, wherein displaying at least one application in the preset application set corresponding to the second touch operation in the preset region in accordance with the preset display strategy comprises:
   determining different groups according to types of different applications in the preset application set; and
   displaying the at least one application in the preset application set in the preset region according to the groups.

6. The method according to claim 1, wherein displaying at least one application in the preset application set corresponding to the second touch operation in the preset region in accordance with the preset display strategy comprises:
   dynamically displaying the at least one application in the preset application set in the preset region, and the dynamical displaying comprising sliding display and scrolling display.

7. The method according to claim 1, wherein adjusting the brightness of the preset region according to the preset strategy comprises lightening the preset region when the electronic apparatus is in a screen extinguished-and-locked state and adjusting a brightness value of the preset region to be greater than or equal to a first brightness threshold.

8. The method according to claim 1, wherein adjusting the brightness of the preset region according to the preset strategy comprises lightening the display screen when the electronic apparatus is in a screen extinguished-and-locked state and adjusting a brightness value of the preset region to be greater than or equal to a first brightness threshold.

9. The method according to claim 1, wherein adjusting the brightness of the preset region according to the preset strategy comprises acquiring a brightness value of the display screen when the electronic apparatus is in a screen lightened-and-locked state, the brightness value of the display screen being a second brightness threshold, and adjusting a brightness value of the preset region to be greater than or equal to the second brightness threshold.

10. The method according to claim 1, wherein when the second touch operation is detected and the electronic apparatus is in a screen extinguished-and-locked state, the electronic apparatus lightens the preset region or the whole display screen according to remaining power or a user's selection.

11. The method according to claim 1, wherein the method further comprises:
after acquiring the fingerprint information:
when it is detected that the fingerprint information does not match the preset fingerprint information, prompting a user to re-enter a fingerprint; and
when the re-entry of the fingerprint is not detected within a preset time, extinguishing the display screen.

12. The method according to claim 1, wherein the at least one application is displayed in a form of at least one application icon.

13. The method according to claim 1, wherein the display of the at least one application is arranged according to alphabetical order of a name of the at least one application, a use frequency of the at least one application, for a user's demands.

14. The method according to claim 1, wherein the method further comprises:
prior to adjusting brightness of the preset region in accordance with a preset strategy when it is detected that a second touch operation on the display screen satisfies a preset condition, and displaying the at least one application in the preset application set in the preset region according to the second touch operation:
determining the preset application set according to a user setting; or
acquiring a number of launching of the at, least, one application within a preset time, and determining the preset application set according to the number of launching.

15. The method according to claim 14, wherein when the preset application set is determined, all of the applications in the preset application set are displayed in the preset region.

16. The method according to claim 14, wherein when the preset application set is determined, only a preset number of applications is displayed according to the number of launching.

17. An electronic apparatus, comprising:
a processor;
a memory;
a communication interface;
a display screen having a preset region;
a fingerprint identification area corresponding to the preset region; and
one or a plurality of programs stored in the memory and configured to be executed by the processor, and the one or the plurality of programs comprising instructions configured to execute operations in a method for opening an application, the method comprising:
displaying at least one application in the preset region;
acquiring fingerprint information when a touch operation for a target application of the at least one application is detected; and
launching the target application when it is detected that the fingerprint information matches preset fingerprint information,
wherein displaying the at least one application in the preset region comprises:
adjusting brightness of the preset region in accordance with a preset strategy when it is detected that a second touch operation on the display screen satisfies a preset condition; and
displaying the at least one application in a preset application set in the preset region according to the second touch operation,
wherein displaying the at least one application in the preset application set in the preset region according to the second touch operation comprises:
querying a preset mapping relationship according to the second touch operation;
acquiring the preset application set corresponding to the second touch operation, the preset mapping relationship comprising correspondence relationship between touch operations and application sets; and
displaying at least one application in the preset application set corresponding to the second touch operation in the preset region in accordance with a preset display strategy.

18. A non-transitory computer readable storage medium, configured to store a computer program for electronic data interchange, wherein the computer program enables a computer to execute a method for opening an application, the computer comprising:
a display screen having a preset region; and
a fingerprint identification area provided opposite the preset region, the method comprising:
displaying at least one application in the preset region;
acquiring fingerprint information when a touch operation is detected; and
launching touched applications when it is detected that the fingerprint information matches preset fingerprint information,
wherein displaying the at least one application in the preset region comprises:
adjusting brightness of the preset region in accordance with a preset strategy when it is detected that a second touch operation on the display screen satisfies a preset condition; and
displaying the at least one application in a preset application set in the preset region according to the second touch operation,
wherein displaying the at least one application in the preset application set in the preset region according to the second touch operation comprises:
querying a preset mapping relationship according to the second touch operation;
acquiring the preset application set corresponding to the second touch operation, the preset mapping relationship comprising correspondence relationship between touch operations and application sets; and
displaying at least one application in the preset application set corresponding to the second touch operation in the preset region in accordance with a preset display strategy.

* * * * *